(12) United States Patent
Pruecklmeier et al.

(10) Patent No.: US 10,439,841 B2
(45) Date of Patent: Oct. 8, 2019

(54) NETWORK INTERFACE, NETWORK AND METHOD FOR DATA TRANSMISSION WITHIN THE NETWORK

(71) Applicant: Airbus Defence and Space GmbH, Taufkirchen (DE)

(72) Inventors: Andreas Pruecklmeier, München (DE); Thomas Pistner, München (DE); Stefan Schneele, München (DE)

(73) Assignee: Airbus Defence and Space GmbH (DE)

( * ) Notice: Subject to any disclaimer, the term of this patent is extended or adjusted under 35 U.S.C. 154(b) by 321 days.

(21) Appl. No.: 15/177,712

(22) Filed: Jun. 9, 2016

(65) Prior Publication Data

US 2016/0365988 A1    Dec. 15, 2016

(30) Foreign Application Priority Data

Jun. 11, 2015 (EP) .................................. 15171749

(51) Int. Cl.
| | |
|---|---|
| *G06F 15/16* | (2006.01) |
| *H04L 12/437* | (2006.01) |
| *H04L 12/42* | (2006.01) |
| *H04L 29/08* | (2006.01) |
| *H04L 12/40* | (2006.01) |

(52) U.S. Cl.
CPC ............ *H04L 12/437* (2013.01); *H04L 12/42* (2013.01); *H04L 67/12* (2013.01); *H04L 2012/4028* (2013.01); *H04L 2012/421* (2013.01)

(58) Field of Classification Search
CPC ....... H04L 12/437; H04L 12/42; H04L 67/12; H04L 51/32; G06F 9/45558; G06F 3/065; G06F 2009/45595; H04W 92/12; H04W 92/14

USPC .......................... 709/251, 250, 203, 238, 239
See application file for complete search history.

(56) References Cited

U.S. PATENT DOCUMENTS

| | | | |
|---|---|---|---|
| 6,724,781 B1 * | 4/2004 | Dupont ................... | H04J 3/085 370/390 |
| 2006/0045097 A1 * | 3/2006 | Kynast .................... | H04L 12/42 370/395.54 |
| 2007/0242604 A1 * | 10/2007 | Takase ..................... | H04J 3/14 370/223 |

(Continued)

FOREIGN PATENT DOCUMENTS

| | | | | |
|---|---|---|---|---|
| WO | 01/15363 A1 | 3/2001 | | |
| WO | WO 2010098811 A2 * | 9/2010 | ............ | H04L 12/43 |
| WO | 2011/017233 A1 | 2/2011 | | |

OTHER PUBLICATIONS

European search report dated Nov. 24, 2015 (EP 15171749.3).

*Primary Examiner* — Liang Che A Wang
*Assistant Examiner* — Kaylee J Huang
(74) *Attorney, Agent, or Firm* — Lerner, David, Littenberg, Krumholz & Mentlik, LLP

(57) ABSTRACT

A network interface of a network user having at least one physical interface for connecting the network interface to a network interface of a different network user, at least one data selector, which is connected to the physical interface and which is suitable for receiving data from the physical interface and sending data to the physical interface, and at least one data switch, which is connected to the data selector and which is suitable for receiving data from the data selector and sending data to the data selector.

12 Claims, 8 Drawing Sheets

(56) References Cited

U.S. PATENT DOCUMENTS

| | | | |
|---|---|---|---|
| 2008/0222447 A1* | 9/2008 | Ram | H04L 12/42 |
| | | | 714/2 |
| 2009/0100189 A1* | 4/2009 | Bahren | H04L 12/422 |
| | | | 709/231 |
| 2013/0108259 A1* | 5/2013 | Srinivas | H04Q 3/0083 |
| | | | 398/25 |
| 2013/0343179 A1* | 12/2013 | Madaiah | H04L 12/437 |
| | | | 370/222 |
| 2014/0032660 A1 | 1/2014 | Nguyen | |
| 2014/0067911 A1* | 3/2014 | Block | G06Q 50/01 |
| | | | 709/203 |
| 2015/0229550 A1* | 8/2015 | Addeo | H04L 43/10 |
| | | | 709/224 |
| 2015/0326310 A1* | 11/2015 | Fujii | H04B 10/038 |
| | | | 398/3 |

* cited by examiner

NETWORK INTERFACE, NETWORK AND METHOD FOR DATA TRANSMISSION WITHIN THE NETWORK

FIELD OF THE INVENTION

The embodiments described herein relate in particular to a network interface of a network user having at least one physical interface for connecting the network interface to a network interface of a different network user, at least one data selector and at least one data switch. Furthermore, the application relates to a network, which has network users with the network interfaces mentioned, and also methods for data transmission and fault detection within the network. Technical advantages result from the fact that the network interface can transmit data within the network, particularly in the case of downlink connections, without or with a very low latency. The network itself can additionally make use of the technical advantages that the network users can be constructed identically to the greatest extent possible, with regards to the hardware, and data can be transmitted reliably and fast, also by means of the methods described here. Defects can be detected reliably and in good time; the communication can be maintained within the network in spite of a defect.

BACKGROUND OF THE INVENTION

In-flight entertainment systems (IFE systems) in civilian aircraft, but also other systems, e.g. in current and future civil and military platforms, demand communication architectures with an ever higher data bandwidth and an ever greater number of network nodes, with a low failure rate and low latency. These requirements often lead to complex wiring with a multiplicity of required plug connections and data lines, e.g. in the case of a star architecture. Disadvantages arise here due to the associated high weight, the high installation outlay and the low adaptability.

Classic star architectures in particular entail a high wiring outlay, which should be avoided by means of daisy chain architectures or ring architectures. However, these architectures have high latency as a disadvantage, such as the HSR (high-availability seamless redundancy) standard.

There may be a need for a network interface, which allows a reduction of latency during the transmission of data in a network. Furthermore, there may be a need for a network with network users, which comprise the network interface, which network has a high reliability and low latency at the same time as a low wiring outlay. Furthermore, there may be a need for methods for the reliable data transmission within this network with low latency—even in the event of the presence of a defect inside the network.

BRIEF SUMMARY OF THE INVENTION

According to one aspect, a network interface of a network user is described, which has at least one physical interface for connecting the network interface to a network interface of a different network user.

Furthermore, the network interface can comprise at least one data selector, which can be connected to the physical interface, for example by means of at least one data line. Unless otherwise shown or mentioned, the term connected should not limit the connected components to being connected to one another directly; thus absolutely any further components can be arranged between the two connected components. "Connected" may however also comprise direction connection. The data selector can be adapted to receive data from the physical interface and/or send data to the physical interface. Additional functions or connections to other components may be provided or set up.

Furthermore, at least one data switch may be provided, which can be connected to the data selector, by means of at least one data line for example. The data switch can be adapted to receive data from the data selector and/or send data to the data selector. The data switch can furthermore be connected to other/additional components. The data switch can preferably have a data connection to the network user or further internal components thereof, for example to internal data memories, computers, display devices or the like, which are connected to the network interface. For example, if the network user is an IFE unit of an aircraft, which has the network interface described here, then the data switch can be connected to the internal computer and/or memory of the IFE unit and regulate the transfer of the data from/to these components of the IFE unit.

Furthermore, the data selector can be adapted to forward data received from the physical interface to a physical interface for transferring the data to a different network user and to the data switch. The forwarding of the data to a physical interface can particularly preferably comprise the physical interface of the network user, to which the data are forwarded, being a different interface from the physical interface, from which the data were received. In particular and preferably, the data can be forwarded from the data selector to a different network user and the data switch simultaneously. The data switch can "decide", for example in the case of a downlink in which a server of the network sends data to clients, whether the received data are forwarded to the network user or the internal components thereof, such as e.g. a memory or a computer. If, for example, a passenger on an aircraft orders a video at their seat or at their IFE unit, then only the data switch of this network user would forward the video data. The data switches of other network users, who have not ordered the video, then block the transfer to the associated IFE unit.

Preferably, the data selector according to the aspect described here essentially forwards the received data simultaneously or as fast as possible, e.g. without intermediate storage, via its own physical interface to a further network user or the physical interface thereof. A further or different network user can preferably be the network user that is arranged adjacently to the network user in the network in the data flow direction.

The technical advantage of the network interface described here is therefore that no latency periods occur as in previously known network interfaces, which do not have a data selector for the prompt forwarding of data to the next network user. Known network interfaces or network users have a data switch which initially undertakes intermediate storage of the received data and initially sends the same to the network user or the internal components thereof before the data is further sent, if appropriate, to a further network user or the interface thereof or the physical interface thereof. In other words, the data selector has the technically advantageous property that received data are forwarded to the greatest extent possible without a time delay or with only very slight latency to the next network users and (simultaneously) to the network users of the data selector itself. Latency periods are therefore effectively reduced or eliminated.

According to a further aspect, the network interface can have at least one (unidirectional) physical interface for a downlink and at least one (unidirectional) physical interface for an uplink. Downlink should mean, particularly in connection with a network, that a server network user (or server for short) sends data to the client network users connected in the network (or clients for short), which data these can receive, and if necessary, forward. Uplink should mean, particularly in connection with a network, that a client network user sends data to the server connected in the network, if appropriate via the other client network users, which data the server can receive and, if necessary, forward.

Furthermore, the physical interface can be designed bidirectionally. In a bidirectional design of the physical interface, each network interface can preferably have only one own physical interface, in order to reduce the number of components and costs. In the event that only one individual (bidirectional) interface is provided, data can be received and sent via the same. Unidirectional or bidirectional should not be understood in a limiting manner to mean that the data flow directions or the receiving or sending properties cannot be changed. Thus, it is a preferred aspect described here that in the event of a defect within a network, the data flow direction can be reversed at least temporarily, which is described in detail below.

Furthermore, the lines, which are connected to the physical interface, can also be designed bidirectionally or unidirectionally. The bidirectional line can transport data for reception and sending, whilst in the case of unidirectional lines, in each case two lines with a physical interface can be connected in order to enable the reception and sending of data. Combinations of unidirectional and bidirectional physical interfaces and lines connected thereto can be formed, depending on the use requirements.

Furthermore, the network interface can be part of a client network user and/or part of a server network user. In order words, the network interface described here can be constructed identically for server and client, particularly and preferably with regards to the hardware, which results in cost advantages, with regards to the use of as many identical components as possible, and reduces the complexity of a network, which has these network users.

Furthermore, the data selector of a client network user can be adapted to duplicate incoming data from a physical interface (preferably in the case of a downlink) and to forward the same to a different network user and the data switch, without intermediate storage. As a result, high latency periods are avoided, and it is enabled that both the data switch and the next network user receive the data simultaneously to the greatest extent possible.

In the case of an uplink, particularly if this is used less often, less time-critical and/or only comprises small data volumes (as is usually the case e.g. in IFE systems of aircraft), the data can (unlike in the case of the downlink) in each case be directed via the data switch, so that certain latency periods occur here and can be taken into account.

The data selector, particularly that of a client network user, can be adapted for incoming data from a physical interface, preferably in the case of a downlink, to carry out a timing recovery, the term "data and clock recovery" also being common for the timing recovery.

Furthermore, the data selector can be connected to at least one physical interface and the data switch for transmitting at least (operating) data between these components of the network interface (particularly in terms of data or by means of a data line). A control device of the network interface can furthermore be connected at least to the data selector, the physical interface and the data switch in such a manner that control signals between the control device and these components can be transmittable. The (operating) data can in particular comprise data transmitted in the network, such as e.g. video or audio data in the example of the aircraft IFE system. Control signals can preferably be transmitted via the same lines as the remaining data or separate control lines. A control signal, which the control device can send to the data switch can for example comprise the control command to not forward the incoming data to the network user, i.e. to close the data switch.

Furthermore, the control device can be connected to the network user or components of the network user, such as e.g. a computing unit, a display unit, a memory unit or the like, via a status line, in order to receive status information of the network user. The status information may display e.g. a state of the network user, so that for example, a fault or a defect of the network user can be shared with the control device or the network interface thereof by means of status information with little computing outlay and without a time delay.

Furthermore, the network interface of a server network user can be suitable to send and/or to receive data in a downlink and an uplink via the data switch in each case. Because the processes inside the client network user have the greatest influence on latency periods during the transmission within the network, the network interface of a server network user can even be realised without a data selector. The data selector may also be provided however and alternatively, the data selector can also be configured in the same way as for the client network user. Depending on the configuration, a less complex construction of a network with components and configurations that are identical to the greatest extent possible and/or the construction of a network, which enables an even greater reduction in latency periods, is therefore possible.

The network interface of a server network user can furthermore be adapted so as to compare the data received from a last client network user in a downlink with data that were sent by the server network user to a first client network user. This comparison can be used for example to determine whether the sent data of a downlink have arrived correctly at all client network users. The terms "last" and "first" in this case preferably relate to a network, which is constructed as a ring, the server being connected to the last and first client directly. Therefore, data error tests are enabled in a less technically complex manner.

Furthermore, a network is described here with a multiplicity of network users according to at least one of the preceding aspects, which can be connected to one another serially in a ring arrangement. At least one of the network users can in this case preferably be a server network user and the further network users can be client network users.

Thus, a communication architecture is suggested, which combines a daisy chain architecture with a ring architecture and uses the technical advantages thereof. Data can be transferred within the ring arrangement of the network users without latency periods, because the data selector of the respective network interface also immediately transfers received data to the next network user in the ring arrangement. The aspect described here furthermore particularly preferably contains a hardware-implemented technical solution and as a result enables a simple qualification and implementation in products. For example, it is not necessary to change the data protocol.

The physical connections between the network users can preferably be realised fibre optically and/or electrically.

Furthermore, a method is described here for sending data within the network according to at least one of the preceding aspects.

The server network user can, in the case of a downlink, send data to a physical interface of a first client network user. The data selector of the first client network user can forward the data from the physical interface via the data switch to the first client network user and via the same or a second physical interface (depending on whether one single physical interface or a plurality of physical interfaces are present) to the physical interface of the next client network user. The data selector of the last client network user can forward the data to its client network user and to the server network user.

This method therefore allows downward transmission of data within the network, which is as free of latency as possible, particularly because no intermediate storage takes place in each individual network user or network interface. With regards to networks with a large number of network users in particular, considerable increases are therefore enabled with regards to data transmission times.

Furthermore, a client network user in the case of an uplink can send data to a physical interface of adjacent client network users in the data flow direction. The data selector of the receiving client network user can send the data from the physical interface via the data switch to the first client network user and the data switch can forward the data via the same or a second physical interface (depending on whether one single physical interface or a plurality of physical interfaces are present) to the physical interface of the next client network user until the server is reached. Furthermore, the data switch of the last client network user can forward the data to its client network user and to the server network user.

In the case of a downlink or uplink, the server network user can preferably receive and/or send data via the data switch and the data selector.

Alternatively, if the uplink is also time-critical, forwarding can take place via the data selector, analogously to the method in the case of an uplink.

Furthermore, a method for data transmission in the case of a defect within the network is described here according to the following aspects. A defect can for example comprise: connection interruption between clients/servers and/or a defective client. After the occurrence of a defect, the client network users, which are arranged in the network in the data flow direction downstream of a position of the defect, can reverse the data flow direction. Reversing preferably means that the technical function of the physical interfaces is interchanged compared with normal operation, and the data flow direction is turned around. Thus, in connection with the reversal, the physical interface of a network interface, which before the reversal was adapted to receive data in an downlink, can be adapted in the event of a defect to forward data (to an adjacent network interface). The other physical interface of the network interface, which before the reversal was adapted to forward data in a downlink, can now be adapted in the event of the defect to receive data from an adjacent network interface. This reversal is carried out analogously in the case of the uplink. In the case that the network interface has a single bidirectional physical interface, the reversal can be carried out analogously if necessary. Because all network users after/downstream of a defect location, e.g. a cable interruption or a defective network user, in the data flow direction are "reversed" in such a manner, communication with these network users is enabled in particular in that the server can be adapted in the event of a defect so as to send or to receive data in both directions of the network ring, i.e. to send or to receive data via (both of) its physical interface(s). It is to be noted here that, in the normal operating state, the server in which no defect is present can preferably switch a physical interface to "standby" or can only use the same for receiving comparative data.

As has already been mentioned, the server network user can send data via (both) physical interface(s) to the client network users, in the case of a downlink, and receive data from both sides of the network ring, in the case of an uplink.

This method makes it possible to furthermore send data to the network users, at least to the error-free network users, reliably and free of latency even in the case of a defect.

Method for data transmission in the event of a defect within the network according to at least one preceding aspect, it being possible to detect a defect in that a client network user and/or server network user has not received any data for a predetermined time, a physical interface reports a defect (which was detected by means of an internal function, for example) and/or a client network user reports a defect to the control device by means of the status signal via the status line. The network user which has detected a defect can switch off a physical interface, which connects it (the network user) to a next or adjacent network user in the ring circuit in the data flow direction. Thus in the series circuit of the network users, a defect detection can be transferred successively and fast, because the switching off of the physical interface can in turn be detected by the adjacent network interface and the same can then likewise turn off the corresponding physical interface.

When the transfer of the defect detection reaches the server network user, then the server network user can confirm this information and send the data signal in the series of network users, which can trigger the reversal of the data direction within each network user downstream of the defect location. Alternatively, the client network users, which have detected a defect, can also reverse their data directions after a certain wait time. Thereafter, the server can send data in both directions of the network ring, so that the reliable operation of the network can be maintained to the greatest possible extent.

In summary, a network interface is presented here, which can forward data within a network without a latency period, particularly in the case of downlinks. The network itself can additionally make use of the advantages that the network users can be constructed identically to the greatest extent possible, in terms of hardware, and data can be transmitted reliably and fast, also by means of the methods described here. Defects can be detected reliably and in good time and the communication can nonetheless be maintained within the network. Thus, a technical option is described here for enabling latency-period-optimised and reliable communication.

BRIEF DESCRIPTION OF THE DRAWINGS

The aspects presented here are described in the following by way of example with reference to the attached, schematic figures. In the figures FIG. 2, FIG. 4 shows the illustration of the data flow in a server network interface according to e.g. FIG. 2, FIG. 5 shows the illustration of various exemplary connection faults within the network according to FIG. 1.

DETAILED DESCRIPTION

Various examples are described in detail and with reference to the figures in the following. Identical or similar elements in the figures are designated with identical reference numbers. The present devices and methods are not limited to the described combinations of features however. Rather, further modifications and combinations of features of various examples should also be included in the context of the protective scope of the independent claims.

Figure 1:
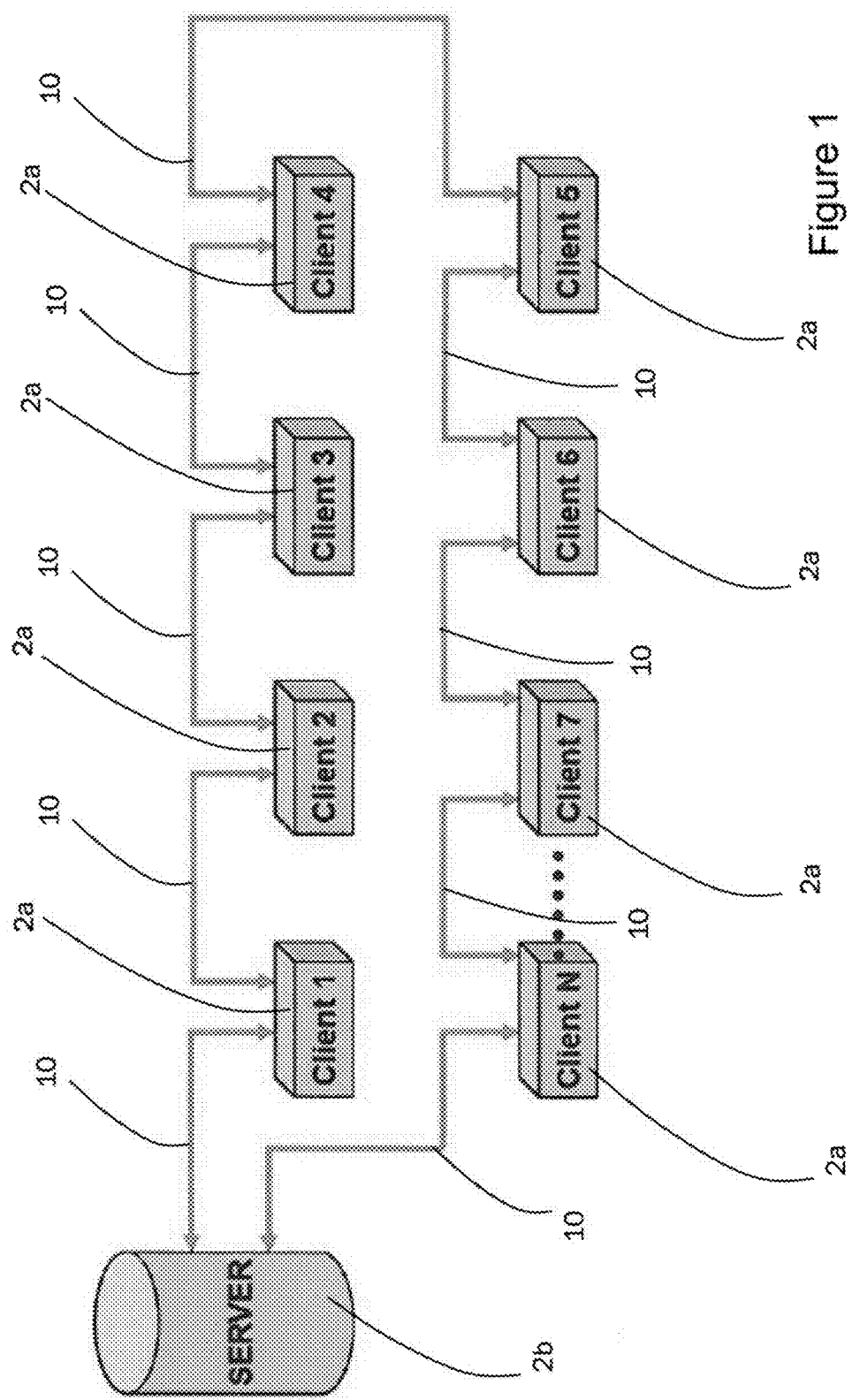
FIG. 1 shows an architecture of a network described here.

FIG. 1 shows a schematic design of a fault-tolerant, latency-period-optimised ring structure of a network described here. The client network users 2a (for short: client; client 1 to client N) are connected in series (daisy chain) to a server network user 2b (for short: server). Both the first "client 1" and the last "client N" are connected to the server 2b, so that a closed architecture, a ring, results.

Figure 3:
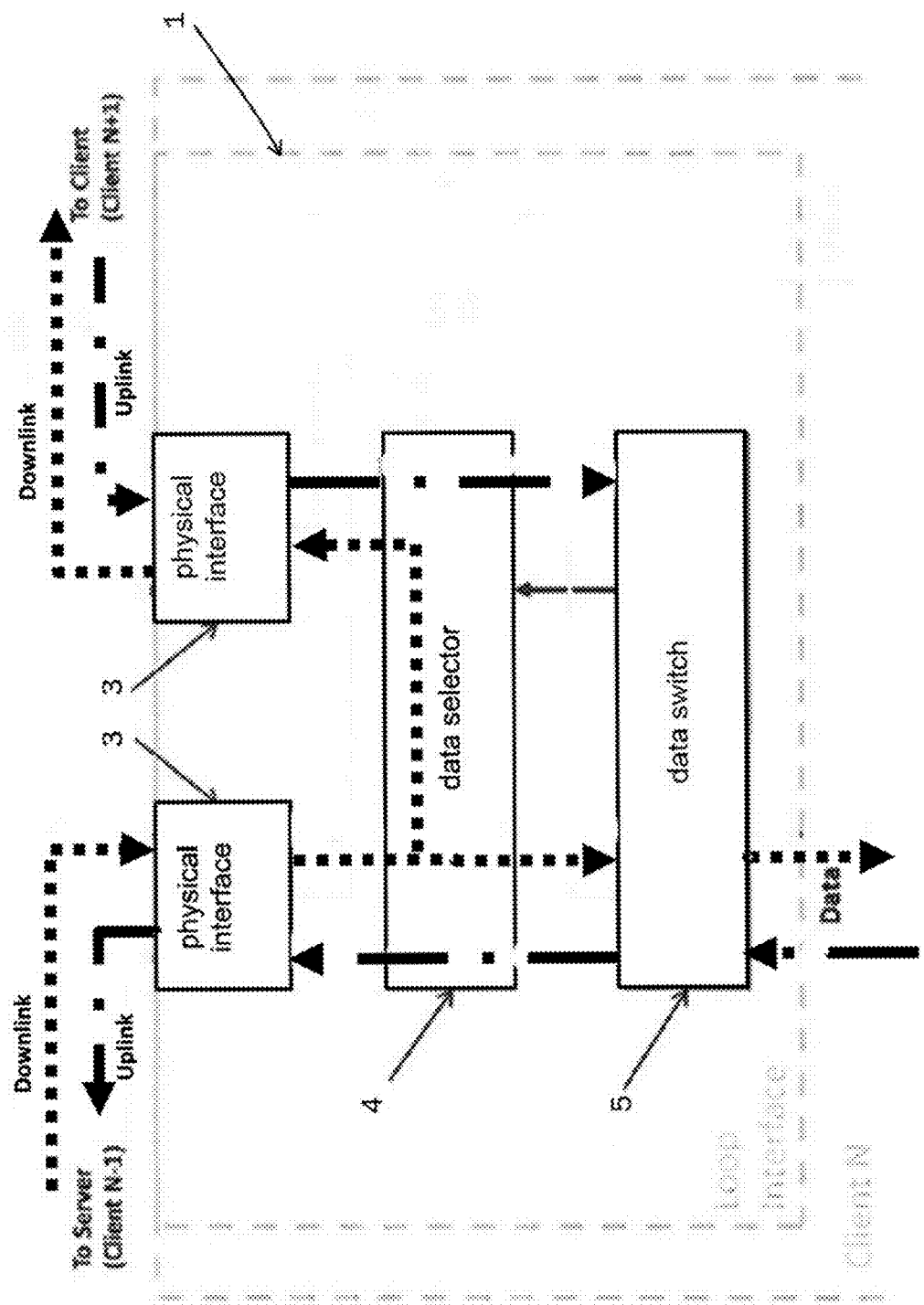
FIG. 3 shows the illustration of the data flow in a client network interface according to e.g.

The data connections are indicated in FIG. 1 with double arrows, from which it can be seen that a communication is possible both in the direction of the server 2b (uplink; dot-dashed lines e.g. in FIG. 3) and from the server 2b in the direction of the client network users 2a (downlink; dotted lines e.g. in FIG. 3). The network users 2 are in each case connected to two other (adjacent) network users 2, so that data can respectively be received from adjacent network users 2 or sent to adjacent network users 2.

Figure 2:
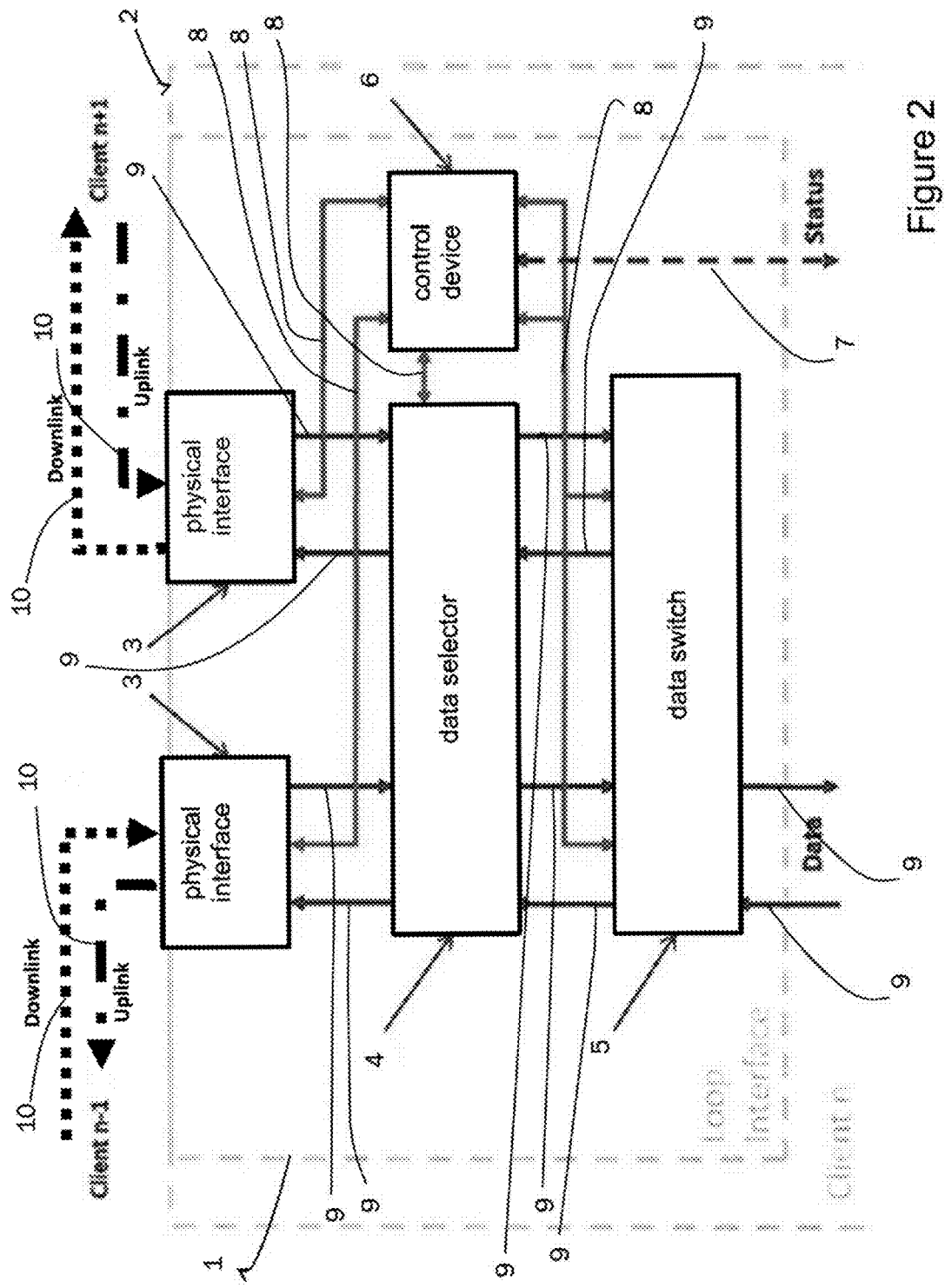
FIG. 2 shows a network interface described here.

FIG. 2 shows the physical network interface 1 (for short: interface) of a client network user 2a within the network architecture according to FIG. 1. The physical connection to the network is shown realised via a physical interface 3. This can be realised bidirectionally (one line for sending and receiving) or unidirectionally (separate lines for sending and receiving, as FIG. 2 illustrates).

Both interfaces 3 are connected to a data switch 5, which can be an Ethernet-based data switch 5 for example, via a data selector 4. This data switch 5 receives the data and forwards the data to the network user 2 for processing. The network user 2 is not shown in any more detail here, but can have its own computing units, memory units, display units, etc. for example, which can further process, store or similar the data received via the data switch 5. The data switch 5 is therefore the instance in the network interface 1, which can permit or prevent the forwarding of the data to the network user 2 or the further components thereof. The data switch 5 is preferably controlled by means of a control device 6, which is connected to the data switch 5 using a control signal line 8, which is shown bidirectionally in FIG. 2. The control device 6 can output the signal to the data switch 5 for example to close the data switch 5, in order to not let data pass to the network user 2.

Furthermore, the control device 6 can take over the control of the physical interfaces 3 and the data selector 4. The control device 6 can furthermore exchange status and control information with the corresponding network user 2 (client). One example for status information is that the network user can display an internal fault or defect so that the control device 6 can activate a defect mode, which is described below.

In addition, the network interface 1 shown according to FIG. 2 also has the previously mentioned data selector 4. The data connection lines 9 in FIG. 2 show that the data selector 4 (particularly with regards to the data flow) is arranged between the two physical interfaces 3 shown and the data switch 5. The two physical interfaces 3 can receive or send data via the externally shown lines 10. The lines 10 are labelled with "client n−1" or "client n+1", so that it becomes possible to see the network user 2 to which the physical interface 3 is connected in the data flow direction (upwards: n−1; downwards: n+1).

The function of the data selector 4 is explained in detail in the following: when sending data by means of a downlink, the data are sent by the server network user 2b to the client network users 2a. In this case, the client network users 2a do not buffer store the data before they forward the data to the next client network user 2a in the series. This is illustrated by FIG. 3, which shows the data flow within the network interface 1 for the uplink case and downlink case in normal mode (i.e. there is no defect).

Thus, FIG. 3 shows in detail that in the case of a downlink, the client network user 2a (client N−1 in FIG. 3) or server network user 2b sends data and the physical interface 3 of the first/next client network user 2a receives the same. The data are then transferred within the network interface 1 to the data selector 4, which forwards the data without intermediate storage both to the data switch 5 and to the second physical interface 3 shown on the right in FIG. 3, which interface is connected to the next client network user 2a (in FIG. 3: client N+1) in turn. As a result, high latency periods, as otherwise occur in the case of conventional daisy chain or ring architectures, are prevented. In other words, the data selector 4 takes over the direct forwarding of the data, which transfers the data without intermediate storage both to the next client network user 2a and its own client network user 2a.

Optionally, before the transfer, the data stream can be refreshed by means of a so-called "clock and data recovery". Although this adds a very small latency period in the bit width, this can be ignored.

The last client network user 2a (client N in FIG. 1) in the network ring transfers the data directly back to the server 2b. This can optionally compare the received data with the sent data in order to detect any transmission faults or loop interruption.

If data are sent from the client network users 2a to the server 2b in an uplink (FIG. 3), these are directed via the data switch 5. The data switch 5 receives the data of its own client network user 2a and all subsequent client network users 2a (client N+1) and transfers these to the previous client network user 2a. The first client network user 2a (client 1) transfers the data directly to the server 2b.

Figure 4:
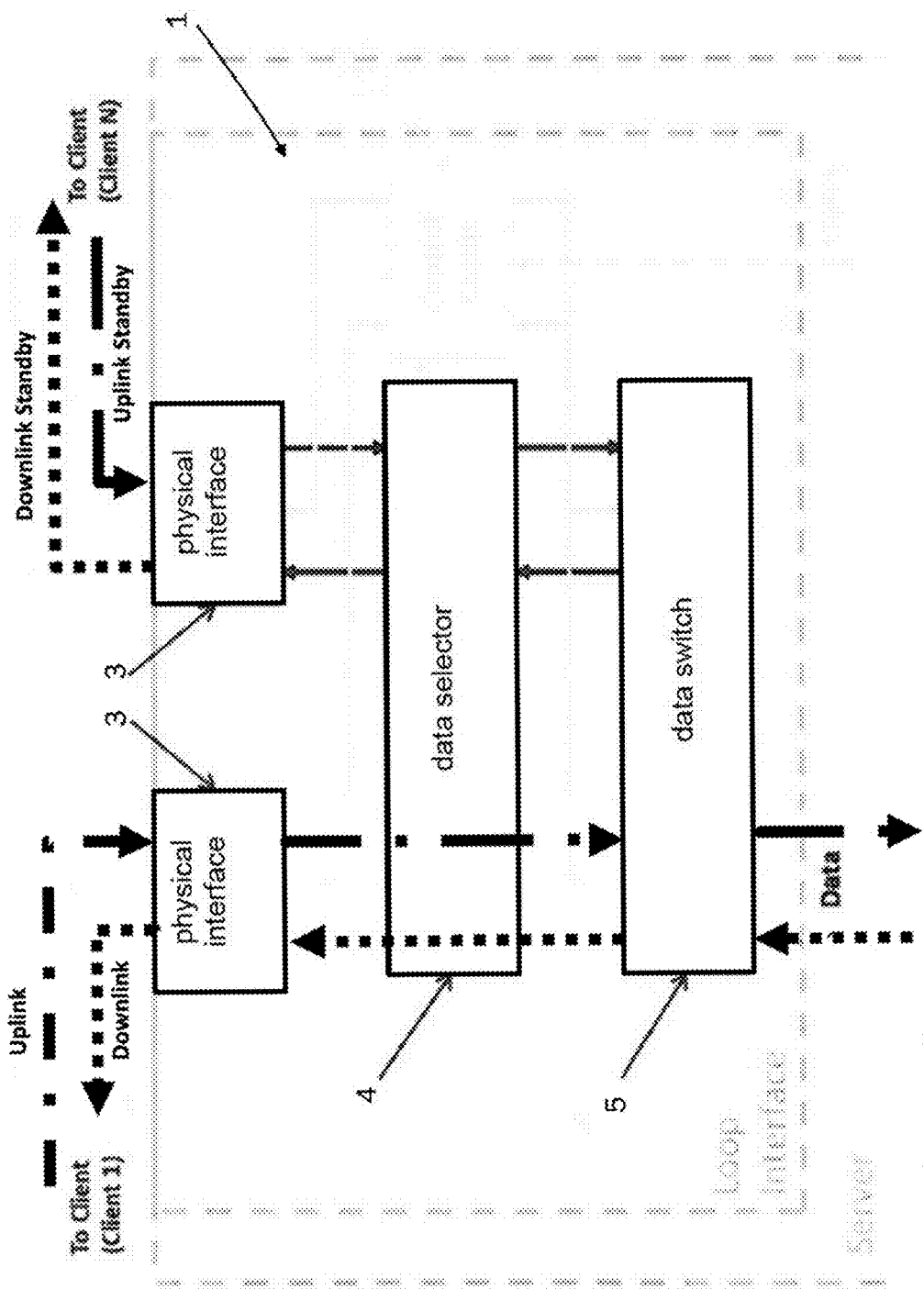

The server 2b has the same network interface 1 as the previously described client network users 2a. The data flow is preferably different compared to the client network users 2a, as FIG. 4 illustrates. The data from the server 2b to the client network users 2a (downlink) are transferred via the data switch 5 and the data selector 4 to the client network user 2a with the label "1" in FIG. 1. Likewise, the data from the client network users 2a to the server 2b (uplink) are transferred via the data selector 4 and the data switch 5 to the server 2b. The network connections/interfaces 3 of the server 2b in the direction of the last network user 2a (client N in FIG. 1) are preferably switched to standby (the associated lines between the right physical interface 3 and the data selector 4 or the data selector 4 and the data switch 5 are labelled with thin interrupted lines).

The above indicated structure of the network interface 1, the wiring of the network users 2 and the network makes it possible in particular that identical network interfaces 1 can be used in terms of hardware and latency periods can preferably be reduced considerably in the case of data downlinks.

Figure 5:
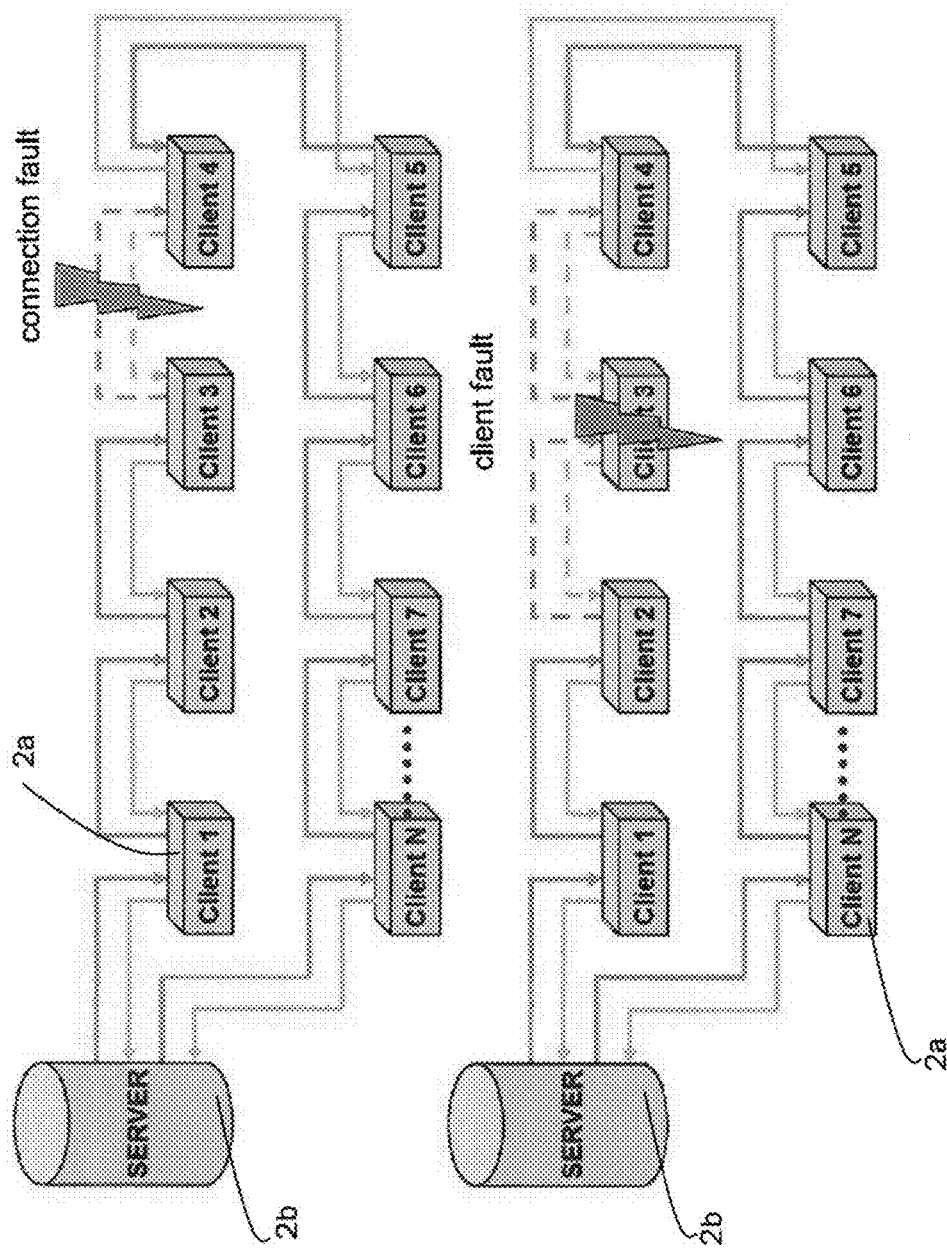

Furthermore, defects or faults may occur within the network, for which certain defect routines are provided here and described in the following. The data connection from server 2b to the client network users 2a may for example be interrupted by a connection fault (e.g. a cable break), as illustrated in FIG. 5 above, or by means of a fault of a client network user 2a, as illustrated in FIG. 5 below. In order to isolate this fault location and to keep a connection to the server 2b in spite of the fault or defect, the data direction (downlink and uplink) for all client network users 2a is reversed after the fault location, so that all client network users 2a can still be reached by the server 2b.

Here, the server 2b communicates from both sides of the network ring with the client network users 2a. The data flow in the network interface 1 of the client network users 2a, which are located upstream of the fault location, is not changed thereby. The data flow in the network interface 1 of the client network users 2a, which are located after the fault location, is reversed, which is illustrated schematically in FIG. 6.

Figure 6:
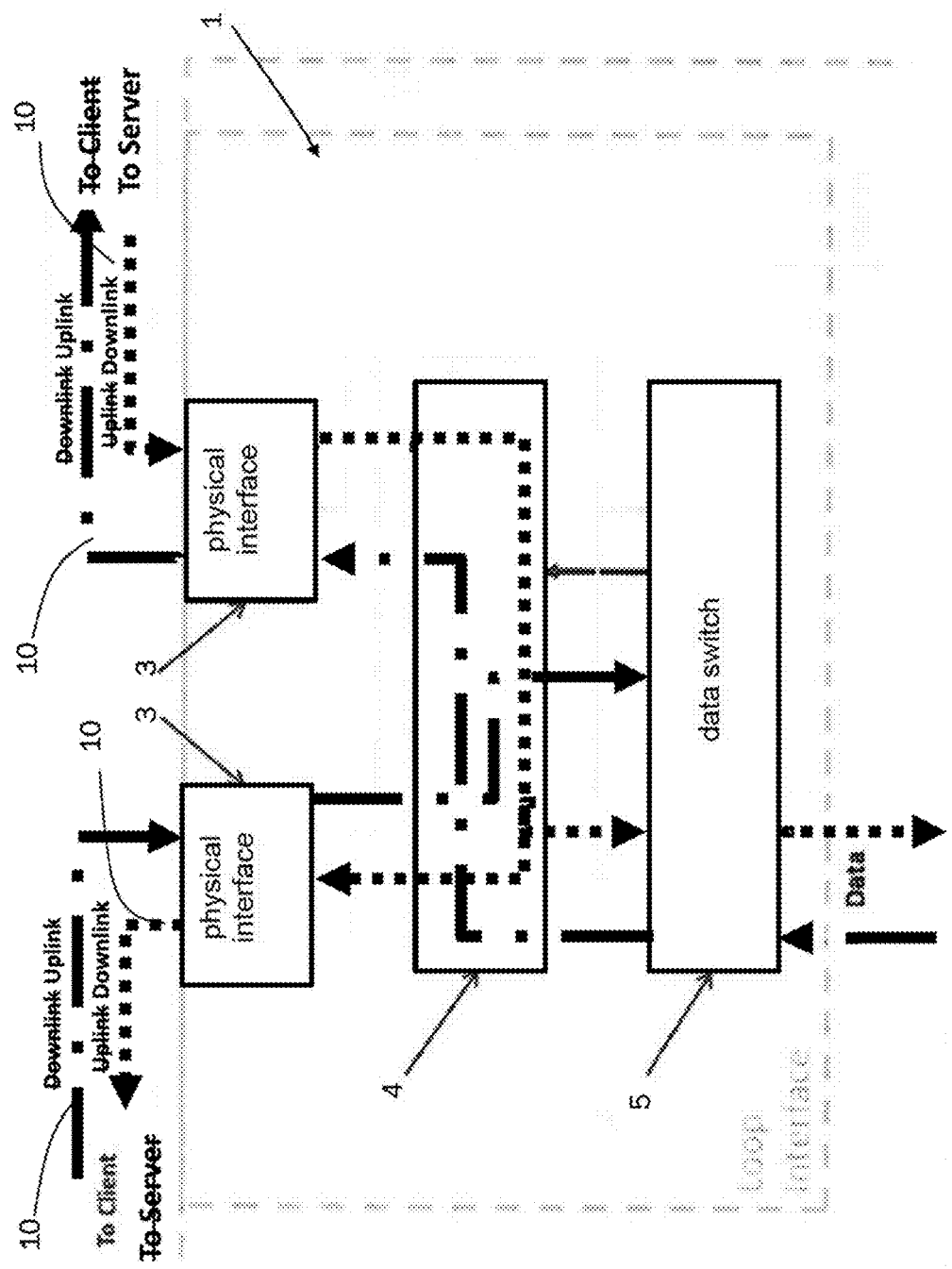
FIG. 6 shows the illustration of the data flow in a client network interface after a fault location.

In the upper region and marked with a "strikethrough", FIG. 6 shows the respectively reversed function of the lines 10, which lead to the physical interfaces 3 or depart therefrom. Thus, the physical interface 3 configured for receiving in normal mode during a downlink, which is arranged on the left in FIG. 6, is called upon, in the event of a defect in a downlink, as interface 3, which forwards data to the next client network user 2a (instead of receiving data from the same in the downlink, as previously). Analogously, the technical function of the physical interface 3 on the right in FIG. 3 and the data lines 10 assigned to it is also changed. In the case of an uplink, reversal takes place analogously for both physical interfaces 3, as the corresponding labels in FIG. 6 clarify once more. The above-described functionality with regards to the sending or forwarding of data via the data selector 4 or the data switch 5 is retained by contrast (with the exception of the data flow direction), i.e. particularly in the case of a downlink, data are transferred from the data selector 4 directly to the physical interface 3, which conveys data to the next network user 2a, and to the data switch 5, whilst in the case of an uplink, the data are conveyed via the data switch 5 (and the data selector 4).

Figure 7:
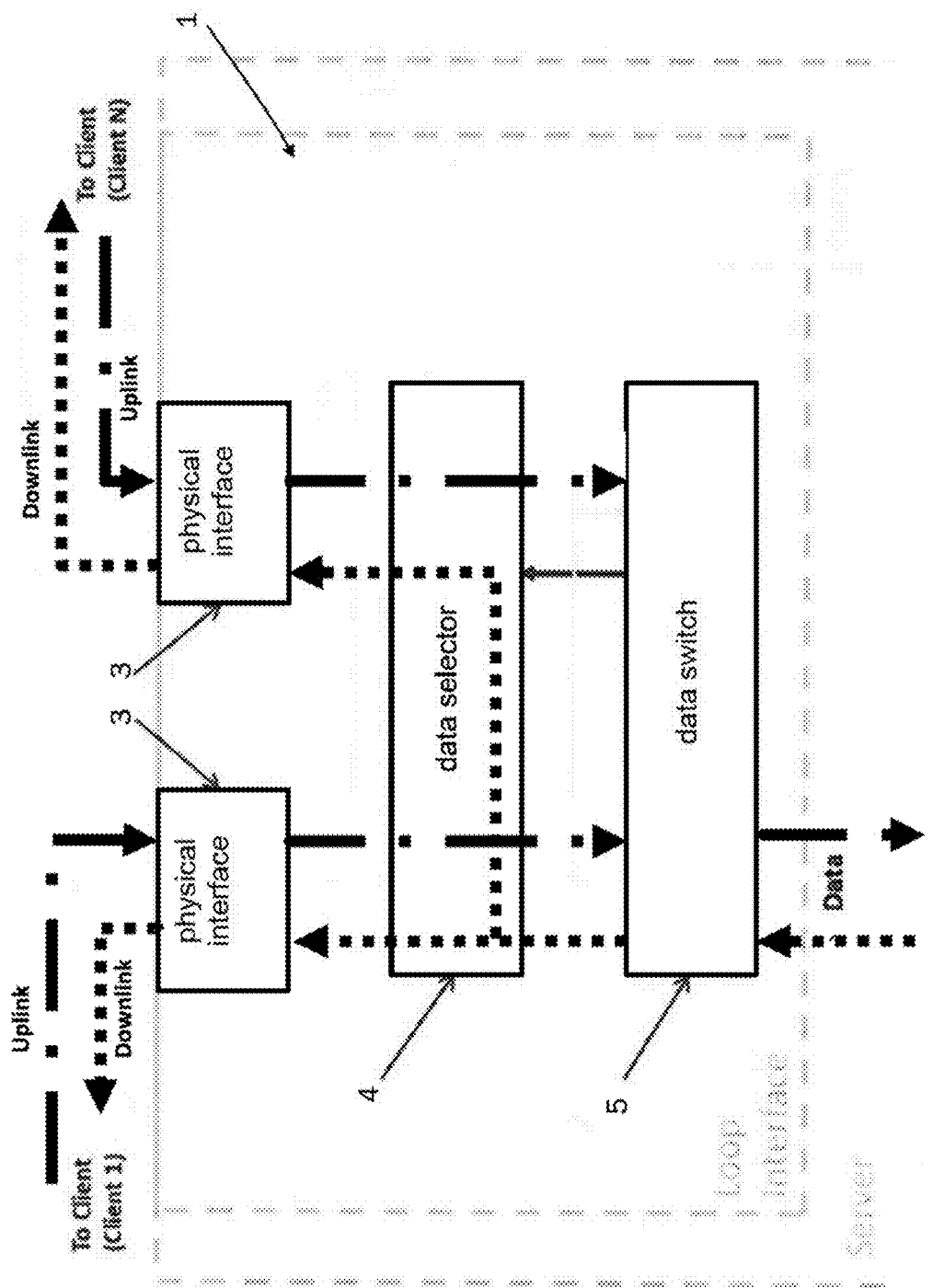
FIG. 7 shows the illustration of the data flow in a server network interface in the event of a fault.

In the event of a fault, the data flow in the network interface 1 of the server 2b changes such that the data of the downlink are output both to the first client network user 2a (client 1 in FIG. 1) and to the last client network user 2a (client N in FIG. 1), as is illustrated schematically in FIG. 7.

The data of the uplink (e.g. from client 1 and client 2 in FIG. 1) are supplied to the server 2b via the data switch 5.

The reversal of the data flow in the client network users 2a after the fault location and the data sending from the server 2b in both directions of the network ring makes it possible that a defect does not tend to interrupt the further operation of the network completely. Rather, the network can continue to operate "almost" at full capacity. This offers a considerable advantage for systems in which the methods are used with regards to the reliability or failure safety of the system, particularly if the same should be used over long periods and by many users, such as e.g. IFE systems of aircraft.

The defect routine, which was described above in connection with the FIGS. 5-7, is preferably triggered when a defect has been detected. This preferably takes place in accordance with the following statements: If a connection fault occurs due to cable breakage or due to a fault of a client network user 2a (for example client Z in FIG. 8), the following network user 2a (client Z+1 in FIG. 8) detects this due to the loss of the connection signal. This is signalled by the "Loss of Signal" (LOS) signal in the case of optical transceivers, for example.

Furthermore, defects can also be detected in that the network user 2 forwards a defect signal to the control device 6 of the network interface 1 via the status line 7, which is contained e.g. in FIG. 2. Furthermore, it can also be provided that the network interfaces 1 expect data in predetermined time intervals and test the reception, e.g. by means of ping signals. Should these be absent within the predetermined time periods, then it may likewise imply a defect, e.g. due to cable breakage in the line, from which data are received.

The transfer of the information of the site of the fault location can on the one hand take place by means of a software-implemented data protocol or by means of a software-independent hardware-integrated solution. Here, the client network user 2a (client Z+1 in FIG. 8), which has detected a fault, switches off the data signal for the next network user 2a (client Z+2 in FIG. 8), so that the same likewise detects an interruption. Thus, the information of a fault location is transferred up to the server 2b, similarly to in the case of chain synchronisation.

Figure 8:
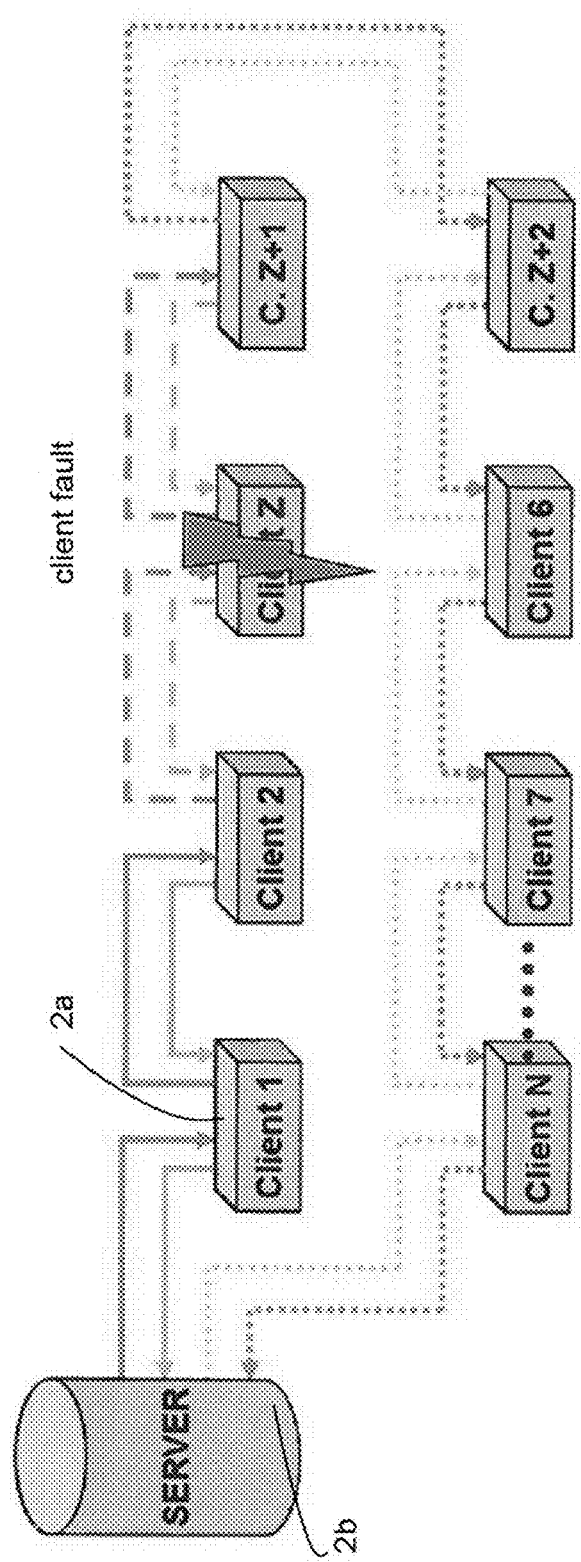
FIG. 8 shows the illustration of the forwarding of a detected fault location by means of chain-synchronised switching off of the data signal in a network described here.

The server 2b detects the presence of a fault and confirms the information in that it switches the data signal off in the reversed direction of the last network user 2a (client N in FIG. 8). This transfers the confirmation of the server 2b in that it likewise switches off the data signal in the direction of the preceding client network user 2a (client N−1 in FIG. 8). Thus, the confirmation of the server 2b is transferred by chain synchronisation up to the client network user 2a (client Z+1 in FIG. 8), which has detected the fault.

All client network users 2a, which have detected a fault and received the confirmation by the server 2b, then reverse the data flow, as was previously described, and switch the data signal on again.

The server 2b then communicates with the network users 2 from both sides of the ring, as has already been described. In a solution based on a software-implemented data protocol, the server 2b then receives the site of the fault location by means of the client network users 2a downstream of the fault location (client Z+1 in FIG. 8) with a corresponding data record.

The server 2b then reverses the data flow of its network interface 1, as has already been described, and sends the network users 2, which are located after the fault location (client Z+1 to client N in FIG. 8), an instruction to reverse the data flow in their network interface 1, as has already been described. The server 2b can then furthermore communicate with all network users 2 from both sides of the network ring.

Finally, it can therefore be summarised that a network interface 1 is presented here, which can minimise latency periods in networks, particularly ring networks. Furthermore, a network is described, which is very fail-safe, has low latency periods, can be built with as many identical components as possible and the communication can be maintained to the greatest extent possible in the case of a defect. Furthermore, defects can be detected fast and reliably.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A network having a multiplicity of network users connected to one another in a ring arrangement, each of the network users comprising:
   a first physical interface for connecting a network interface of a corresponding network user to a network interface of a second network user;
   a second physical interface for connecting the network interface of the corresponding network user to a network interface of a third network user;
   at least one data selector connected to the first physical interface via a first data connection line and to the second physical interface via a second data connection line, the at least one data selector comprising a data receiver configured for providing a data receiving connection to at least one of the first and second physical interfaces, and a data transmitter configured for providing a data transmitting connection to at least one of the first and second physical interfaces; and
   at least one data switch connected to the at least one data selector via at least a third data connection line and configured for receiving incoming data from the at least one data selector or transmitting outgoing data to the at least one data selector,
   wherein the at least one data selector is configured for forwarding data received from one of the first or second physical interfaces to one of the second or third network users and to the at least one data switch,
   wherein the at least one data selector is further adapted to duplicate the data received from one of the first or second physical interfaces in a downlink and to forward the received data to one of the second or third network users and the at least one data switch, without an intermediate storage,
   wherein at least one of the network users is a server network user and other network users are client network users, and
   wherein after an occurrence of a defect, the client network users, which are arranged in the network in a data flow direction downstream of a position of the defect, are configured to reverse the data flow direction, so that one of the first and second physical interfaces, which was adapted before the reversal, to provide a data receiving connection in the downlink, is adapted to provide a data transmitting connection, and the other of the first and second physical interfaces, which was adapted before the reversal, to provide a data transmitting connection in the downlink, is adapted to provide a data receiving connection, and
   the server network user in the downlink is configured to send data to the client network users in both a downstream direction of the position of the defect and an upstream direction of the position of the defect.

2. The network according to claim 1, wherein each of the network users has the first physical interface for the downlink and the second physical interface for an uplink.

3. The network according to claim 1, wherein the at least one data selector is adapted to carry out a timing recovery for incoming data from one of the first and second physical interfaces.

4. The network according to claim 1, wherein the at least one data selector is connected to at least one of the first and second physical interfaces and to the at least one data switch for transmitting data between the at least one of the first and second physical interfaces and the at least one data switch of the network interface, and
   wherein a control device of the network interface of the network user is connected at least to the at least one data selector, the at least one of the first and second physical interfaces and the at least one data switch in such a manner that control signals are transmittable between the control device and the at least one data selector, the at least one of the first and second physical interfaces and the at least one data switch.

5. The network according to claim 4, wherein the control device is connected to the network user via a status line, to receive status information of the network user.

6. The network according to claim 1, wherein a network interface of the server network user is configured to send and to receive data in the downlink and an uplink via the at least one data switch in each case.

7. The network according to claim 1, wherein a network interface of the server network user is configured for comparing data received from a last client network user in the downlink with data that were sent by the server network user to a first client network user.

8. The network according to claim 1, wherein physical connections between the network users are realized fiber optically or electrically.

9. A method for data transmission in an event of a defect in the network having a multiplicity of network users connected to one another in a ring arrangement, the method comprising:
   connecting, by a first physical interface, a network interface of a corresponding network user, to a network interface of a second network user;
   connecting, by a second physical interface, the network interface of the corresponding network user to a network interface of a third network user;
   wherein at least one data selector comprises a data receiver and a data transmitter;
   providing, by the data receiver, a data receiving connection to at least one of the first and second physical interfaces;
   providing, by the data transmitter, a data transmitting connection to at least one of the first and second physical interfaces, wherein the at least one data selector is connected to the first physical interface via a first data connection line and to the second physical interface via a second data connection line;
   receiving, by at least one data switch, incoming data from the at least one data selector or transmitting outgoing data to the at least one data selector, wherein the at least one data switch is connected to the at least one data selector via at least a third data connection line;
   forwarding, by the at least one data selector, data received from one of the first or second physical interfaces to one of the second or third network users and to the at least one data switch;
   duplicating, by the at least one data selector, the data received from one of the first or second physical interfaces in a downlink;

forwarding, by the at least one data selector, the received data to one of the second or third network users and the at least one data switch, without an intermediate storage, wherein at least one of the network users is a server network user and other network users are client network users, the network comprising a network ring;

when a defect occurs, then reversing, by the client network users, a data flow direction after the occurrence of the defect, wherein the client network users are arranged in the network in the data flow direction downstream of a position of the defect, so that one of the first and second physical interfaces, which was adapted before the reversal, to provide a data receiving connection in the downlink, is adapted to provide a data transmitting connection, and the other of the first and second physical interfaces, which was adapted before the reversal, to provide a data transmitting connection in the downlink, is adapted to provide a data receiving connection, and sending, by the server network user in a downlink, data to the client network users in both a downstream direction of the position of the defect and an upstream direction of the position of the defect.

10. The method according to claim 9, further comprising:

sending, by the server network user, data to the first physical interface of a first client network user, in the case of the downlink;

forwarding, by the at least one data selector of the first client network user, the data received from the first physical interface of the first client network user via the at least one data switch to the first client network user and to a first physical interface of a next client network user;

forwarding, by the at least one data selector of a last client network user, the received data to the last client network user and to the server network user.

11. The method according to claim 9, the method further comprising:

providing, by a first client network user, a data transmitting connection to one of the first and second physical interfaces of a second client network user in the case of an uplink;

sending, by the at least one data selector of the second client network user, data from the one of the first and second physical interfaces of the second client network user via the at least one data switch of the second client network user to the second client network user;

forwarding, by the at least one data switch of the second client network user, the transmitted data to one of the first and second physical interfaces of a third client network user;

forwarding, by the at least one data switch of a last client network user, the transmitted data to the last client network user and to the server network user.

12. The method according to claim 9, wherein the defect is detected if one of the client network users and/or the server network user has not received any data for a predetermined time, one of the first and second physical interfaces reports the defect and/or the client network user reports the defect to a control device of the client network user by a status signal, and wherein a specific network user, which has detected the defect in the network, switches off the one of the first and second physical interfaces which connects the network user to a next network user in a ring circuit in a data flow direction.

* * * * *